Patented Aug. 22, 1939

2,170,198

UNITED STATES PATENT OFFICE 2,170,198

PROCESS FOR MAKING WATER PRINTING INKS

Hans Hadert, Berlin, Germany, assignor to Miehle Printing Press and Manufacturing Company, Chicago, Ill., a corporation of Illinois No Drawing. Application February 25, 1935, Serial No. 8,082. In Germany May 29, 1934

8 Claims. (Cl. 134—36)

(1.) There is an endeavor to use non-inflammable and non-injurious printing inks, particularly in intaglio printing, because the intaglio inks produced from carbo-hydrogen products and from natural and artificial resins and asphalt are inflammable and injurious to the health.

(2.) As a substitute for these printing inks, it has been attempted to produce inks from non-inflammable solvents having but a slight smell and resins, or from shellac, colophony, acaroid-resin (gum acaroides) etc. Mixtures of saponified resins with non-inflammable mixtures of a solvent and resin have also been produced. An extensive use of such mixtures, in practice, has, however, not been possible for the following reasons:

a. Such inks are too expensive in the production.

b. These inks, while having certain good properties (being non-inflammable and waterproof), are not soluble again, after drying on the form-cylinder in the non-working-intervals, and they have the tendency to set-off and smear on the guide bars.

c. These inks are not suitable for rotary printing, because for such work an extremely thin ink is required and in diluting such non-inflammable inks the cleaning of the form-cylinder by the doctor becomes less perfect, a disintegration of the components of the ink takes place, or the inks penetrate through the paper, and, owing to the reduction of the necessary adhesion the depths of the etched plate are quickly filled up.

d. The dilution of the inks must be effected by special mixtures which contain solvents. Cheap solvents soluble in water, are inflammable and solvents which are soluble in water and non-inflammable, or only difficultly inflammable, are very expensive, or have a bad smell.

(3.) I have found that water-proof, and, nevertheless, thin printing inks, which can be well scraped off the form-cylinder by the doctor, can be produced if oils soluble in water, such as sulphonated castor oil commonly known as Turkey-red oil, sulphonated neat's-foot oil, sulphonated oleine, and the like, are used, which are mixed with water in certain proportions. Also dyes such as coal-tar dyes, insoluble in water are used, as well as the usual pigments and filling materials for producing intaglio printing inks, aniline offset inks etc. Inks produced in this way are water-proof when dry on paper. The inks however are too thin for printing and cannot be properly scraped off the form-cylinder by the doctor and give a tone to the cylinder; further, they penetrate through the paper. For this reason, in making the inks or varnish, copal, especially manila copal is added. Extensive trials with various natural and artificial resins have shown that for the process forming the subject matter of this application the manila copal is quite particularly suitable. In comparison with colophony, shellac etc. it has a high melting and softening point, dries quickly on paper and does not penetrate easily through the paper. The print is therefore dry in a few seconds and is not sticky. By the addition of copal, the varnish can be well scraped off the form-cylinder, it does not penetrate through the paper, the water-proof property it already had previously is still further increased, and the copal gives a more or less glossy appearance. According to the kind of printing machine, and the speed of the machine, thicker or thinner varnishes or printing inks can be made by adding more or less copal. Further it has been found by practical trials that manila copal does not lessen the possibility of diluting the inks with water, as is the case with colophony or acaroid resin which loses its clearness and becomes milky and dull as soon as water is added, a disintegration of the solution and considerable precipitation taking place.

(4.) Although the raw materials are always the same, the new varnish or ink can be made in different ways, as shown by the following examples:

Example I a. Solution 1

Firstly, a solution 1 is made consisting, for example, of 2400 kg. water, and 600 kg. of Turkey-red oil.

b. Solution 2

Thereafter a Solution 2 is made which consists of 800 kg. manila copal, 800 kg. alcohol and 200 kg. Turkey-red oil. The solution of these constituent parts can be made in cold or warm condition. It is of advantage to use heat, because the streaky and slimy parts which remain, in dissolving manila copal in alcohol, are dissolved in the presence of Turkey-red oil and leave but a small residue. Further, the manila copal, in the presence of Turkey-red oil, when heated simultaneously, is brought into a condition which is particularly suitable for the present process and a solution of manila copal and alcohol, when subsequently mixed with Turkey-red oil, has not the excellent properties such as are obtained by the above described process. Above all, an ink made from a solution produced with heat in the presence of Turkey-red oil is far less sensitive to water after printing. The solution of manila copal, alcohol and Turkey-red oil, while still hot, is mixed with 120 kg. of ammonia 0.910 gravity. After waiting until the reaction produced by the addition of the ammonia, with spontaneous increase of temperature, is over, the solution is mixed with a mixture of 80 kg. triethanolamine — $(HOCH_2—CH_2)_3N$ —, diethanolamine — $(HOCH_2—CH_2)_2NH$ —, or monoethanolamine — $HOCH_2—CH_2—NH_2$ —, in 2000 kg. water, which has been previously brought to the same temperature as the manila copal solution. These solutions mix excellently, and, when cold, the mixture yields a very clear, uniform varnish, which, when it dries on the stirring implements or vessels, is not milky, but has a clear varnish-like appearance, and becomes hard. The pure organic bases diethanolamine and monoethanolamine have a stronger reaction than triethanolamine which only contains certain percentages (10 to 15% of the first and 5% of the second) of these pure organic bases.

EXAMPLE II

It is not absolutely necessary to reduce the high acidity of the manila copal, in the solution of manila copal, alcohol and Turkey-red oil, by adding ammonia. If desired the ammonia can be omitted and only the mixture of triethanolamine and water may be used, but in this case the quantity of triethanolamine must be twice or thrice as much, according to the acidity of the copal. Soda-lye can also be used to reduce the acidity. In that case, however, the prints would not be waterproof, for which reason the waterproof property must be regained by adding some boric acid to the varnish. Borax can also be stirred into the hot solution of manila copal, alcohol and Turkey-red oil to reduce the acidity, and by so dong no bad results are obtained. In carrying out the process ammonia is only preferred, because it is cheap, it is taken up quickly by manila copal, and it does not impair the water-proof property.

(5) By mixing the Solutions 1 and 2, obtained as above, a varnish of any desired consistency can be obtained, and in all proportions the prints obtained are water-proof. As the Solution 2 only contains 20% alcohol and must be mixed with Solution 1 for practical use, the amount of alcohol in the finished ink is only 10% or as low as 5%, and such quantities do not make the ink inflammable, or injurious to health, nor do they make the very mild ink unpleasant in smell. The ink which dries on the form-cylinder is very quickly dissolved again in the ink trough, because, owing to the presence of Turkey-red oil, the ink only dries very slowly on the metal cylinder. If the machine is not stopped too long, it is even possible to print with an ink not containing any alcohol. In this case the manila copal is dissolved not in a little Turkey-red oil and much alcohol (see Solution 2), but the quantities of Turkey-red oil used in Solution 1 and Solution 2 are used, and the manila copal is dissolved in same in hot condition, and heated as above described. A printing ink produced in this way without alcohol should however only remain on the stationary cylinder for a short time, so that the Turkey-red oil which is dissolved by the ink in the ink trough, on restarting the machine, will also bring the manila copal into solution again. If dried on too long, such ink would not be dissolved again by the ink in the trough, but it will be dissolved if even small quantities of alcohol are in the ink, because manila copal in the condition in which it is present in the ink according to the invention, is very quickly dissolved again. Another resin such as colophony, shellac, acaroid etc. is not so dissolved, as extensive experiments have shown. Such resins require 20, 30 or more percentage of alcohol in the ink, in order to be dissolved in the ink-trough after drying on.

(6) In order to produce finished inks from the varnish made by mixing Solutions 1 and 2, water-insoluble coal tar dyes or pigments are added to the varnish. It is preferable to dissolve the dyes firstly in a heated part of the varnish used and afterwards to increase the quantity of the varnish. For example a blue intaglio ink consists of

|  | Kg. |
| --- | --- |
| Varnish | 94 |
| Lampblack | 4 |
| Victoria blue base B | 2 |

A brown intaglio ink consists, for example, of

|  | Kg. |
| --- | --- |
| Varnish | 92.5 |
| Sudan brown RRN | 2 |
| Sudan red G | 0.5 |
| Lampblack | 5 |

If, in printing, the paper, depth of etching, and printing speed require a thinner ink, this can be obtained by adding cold water to which a small quantity of approximately 10 to 20 per cent of Turkey-red oil has been added.

In mixing the Solutions 1 and 2 a tanning agent, such as tannin, can be added, in order to give the printing ink a glossy appearance.

What I claim and desire to secure by Letters Patent of the United States is:

1. A process for producing water printing inks which consists in preparing a solution of water and a water emulsifiable oil selected from a group consisting of sulphonated castor oil, sulphonated neat's-foot oil and sulphonated oleine, preparing a solution of an alcohol soluble copal resin, alcohol and a water emulsifiable oil selected from the group above mentioned, adding an alkali to said last mentioned solution in an amount necessary to reduce the high acidity of the same, adding an organic base selected from the group consisting of monoethanolamine, diethanolamine and triethanolamine, mixing said solutions and adding to the varnish so produced water insoluble coloring matter.

2. A process for producing water printing inks, which consists in preparing a solution of water and a water emulsifiable oil selected from the group consisting of sulphonated castor oil, sulphonated neat's-foot oil and sulphonated oleine, preparing a solution of manila copal, alcohol and a water emulsifiable oil selected from the group above mentioned, adding triethanolamine and water to said last mentioned solution, mixing said solutions, and adding to the varnish so produced water insoluble coloring matter.

3. A process for producing water printing inks which consists in preparing a solution of water and a water emulsifiable oil selected from the group consisting of sulphonated castor oil, sulphonated neat's-foot oil and sulphonated oleine, preparing a solution containing an alcohol soluble copal resin, alcohol and a water emulsifiable oil, heating said last mentioned solution and while hot adding an alkali thereto in an amount necessary to reduce the high acidity of the same, adding an organic base selected from the group consisting of monethanolamine, diethanolamine and triethanolamine, mixing said solutions and adding to the varnish so produced water insoluble coloring matter.

4. A process for producing water printing inks which consists in preparing a solution of water and a water emulsifiable oil selected from the group consisting of sulphonated castor oil, sulphonated neat's-foot oil and sulphonated oleine, preparing a solution containing an alcohol soluble copal resin, alcohol and a water emulsifiable oil, heating said last mentioned solution and while hot adding ammonia thereto in an amount necessary to reduce the high acidity of the same, adding triethanolamine thereto having a temperature substantially equal to that of the solution, mixing said solutions and adding to the varnish so produced water insoluble coloring matter.

5. A process for producing water printing inks which consists in preparing a solution of Turkey-red oil and water, preparing a solution of manila copal, alcohol and Turkey-red oil, adding to the last mentioned solution an organic base selected from the group consisting of monoethanolamine, diethanolamine and triethanolamine, mixing said solutions and adding to the varnish so produced water insoluble organic coloring matter.

6. A process for producing water printing inks, which consists in preparing a solution of Turkey-red oil and water, preparing a solution of water, manila copal, alcohol and Turkey-red oil, reducing the resinic acid contents thereof by adding an alkali, adding to said second mentioned solution triethanolamine, mixing said solutions, and adding to the varnish so produced water insoluble organic coloring matter.

7. A process for producing water printing inks which consists in preparing a solution of Turkey-red oil and water, preparing a solution of water, manila copal, alcohol and Turkey-red oil, heating said last mentioned solution and while hot adding ammonia thereto in an amount necessary to reduce the resinic acid contents thereof, adding a mixture of triethanolamine and water to said last mentioned solution, mixing said solutions and adding to the varnish so produced water insoluble organic coloring matter.

8. A water printing ink containing in addition to water a water emulsifiable sulphonated oil, alcohol, an alcohol soluble copal resin, and water insoluble organic coloring matter, said ink having the property of being thinned by water while at the same time preserving its original characteristics except its consistency, and said ink containing a relatively small percentage of alcohol compared to its water content and being therefore noninflammable.

HANS HADERT.